United States Patent
Harmon

(10) Patent No.: US 11,945,373 B2
(45) Date of Patent: Apr. 2, 2024

(54) TELEVISION MOUNTING ASSEMBLY

(71) Applicant: Keith Harmon, Fresno, CA (US)

(72) Inventor: Keith Harmon, Fresno, CA (US)

( * ) Notice: Subject to any disclaimer, the term of this patent is extended or adjusted under 35 U.S.C. 154(b) by 146 days.

(21) Appl. No.: 17/691,269

(22) Filed: Mar. 10, 2022

(65) Prior Publication Data

US 2023/0286447 A1 Sep. 14, 2023

(51) Int. Cl.
*B60R 11/02* (2006.01)
*B60R 11/00* (2006.01)

(52) U.S. Cl.
CPC ...... *B60R 11/0235* (2013.01); *B60R 11/0217* (2013.01); *B60R 2011/0003* (2013.01)

(58) Field of Classification Search
CPC ............ B60R 11/0235; B60R 11/0217; B60R 2011/0003
USPC ........ 248/201, 207, 214, 297.31, 316.8, 917
See application file for complete search history.

(56) References Cited

U.S. PATENT DOCUMENTS

| | | | |
|---|---|---|---|
| 6,273,494 B1 | 8/2001 | Beigel | |
| 6,604,722 B1* | 8/2003 | Tan | F16M 13/02 254/122 |
| 7,722,002 B2* | 5/2010 | O'Keene | F16M 13/02 248/220.21 |
| 9,109,742 B2* | 8/2015 | Smith | F16M 11/10 |
| 9,265,346 B1 | 2/2016 | Forney | |
| 10,220,797 B2* | 3/2019 | Newman | B60R 11/0235 |
| D913,998 S | 3/2021 | Pei | |
| 2006/0006296 A1* | 1/2006 | Morita | F16M 11/10 248/200 |
| 2006/0231711 A1* | 10/2006 | Shin | F16M 11/10 248/291.1 |
| 2009/0101780 A1 | 4/2009 | Revelino | |
| 2010/0104124 A1 | 4/2010 | Abraham | |
| 2012/0255919 A1 | 10/2012 | Jones | |
| 2014/0294215 A1 | 10/2014 | Caldes | |
| 2018/0112819 A1 | 4/2018 | Kim | |

* cited by examiner

*Primary Examiner* — Anita M King

(57) ABSTRACT

A television mounting assembly includes a pair of first support brackets each having a lower portion, a central portion angling outwardly from the lower portion and an upper portion extending away from the central portion. Each of the first support brackets is attachable to a vent window frame in a sleeper of a semi-truck and a bed support in the sleeper of the semi-truck. A television mounting bracket is attachable to the upper portion of each of the first support brackets and can be positioned at a variety of locations along the upper portion. A second support bracket is attachable to the central portion of each of the first support brackets such that the second support bracket extends between the first support brackets. A sound bar bracket is mountable to the second support bracket thereby facilitating a sound bar to be mounted to the sound bar bracket.

12 Claims, 6 Drawing Sheets

TELEVISION MOUNTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to mounting devices and more particularly pertains to a new mounting device for mounting a television in a sleeper of a semi truck. The device includes a pair of first support brackets that are attachable between a bed support in the sleeper and a vent window frame in the sleeper. The device includes a television mounting bracket that is attachable to the first support brackets and a second support bracket that is attachable to the first support brackets. The device includes a sound bar bracket that is attachable to the second support bracket for supporting a sound bar. Furthermore, the first support brackets, the second support bracket and the sound bar bracket are comprised of a metallic material to resist the vibration and shaking commonly experienced in semi trucks.

(2) Description of Related Art Including Information Disclosed Under 37 CFR 1.97 and 1.98

The prior art relates to mounting devices including a structural support device for a sleeper of a semi truck which includes poles that are integrated into a sleeper of a truck for reinforcing walls of the sleeper. The prior art discloses a variety of television mounting devices that includes a mounting plate that is attachable to a wall and an armature that is either collapsible against the plate or extendable away from the plate and a television mounting bracket attached to the armature. The prior art discloses a sound bar mounting device which includes a panel that is attachable to a support surface and a pair of wings, each hingedly disposed on the panel, which can be attached to a sound bar. The prior art discloses a television mount device that includes a rail that is attachable to a support surface, a frame integrated into the rail and a pair of arms attached to the frame such that a television is attachable to the arms.

BRIEF SUMMARY OF THE INVENTION

An embodiment of the disclosure meets the needs presented above by generally comprising a pair of first support brackets each having a lower portion, a central portion angling outwardly from the lower portion and an upper portion extending away from the central portion. Each of the first support brackets is attachable to a vent window frame in a sleeper of a semi-truck and a bed support in the sleeper of the semi-truck. A television mounting bracket is attachable to the upper portion of each of the first support brackets and can be positioned at a variety of locations along the upper portion. A second support bracket is attachable to the central portion of each of the first support brackets such that the second support bracket extends between the first support brackets. A sound bar bracket is mountable to the second support bracket thereby facilitating a sound bar to be mounted to the sound bar bracket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
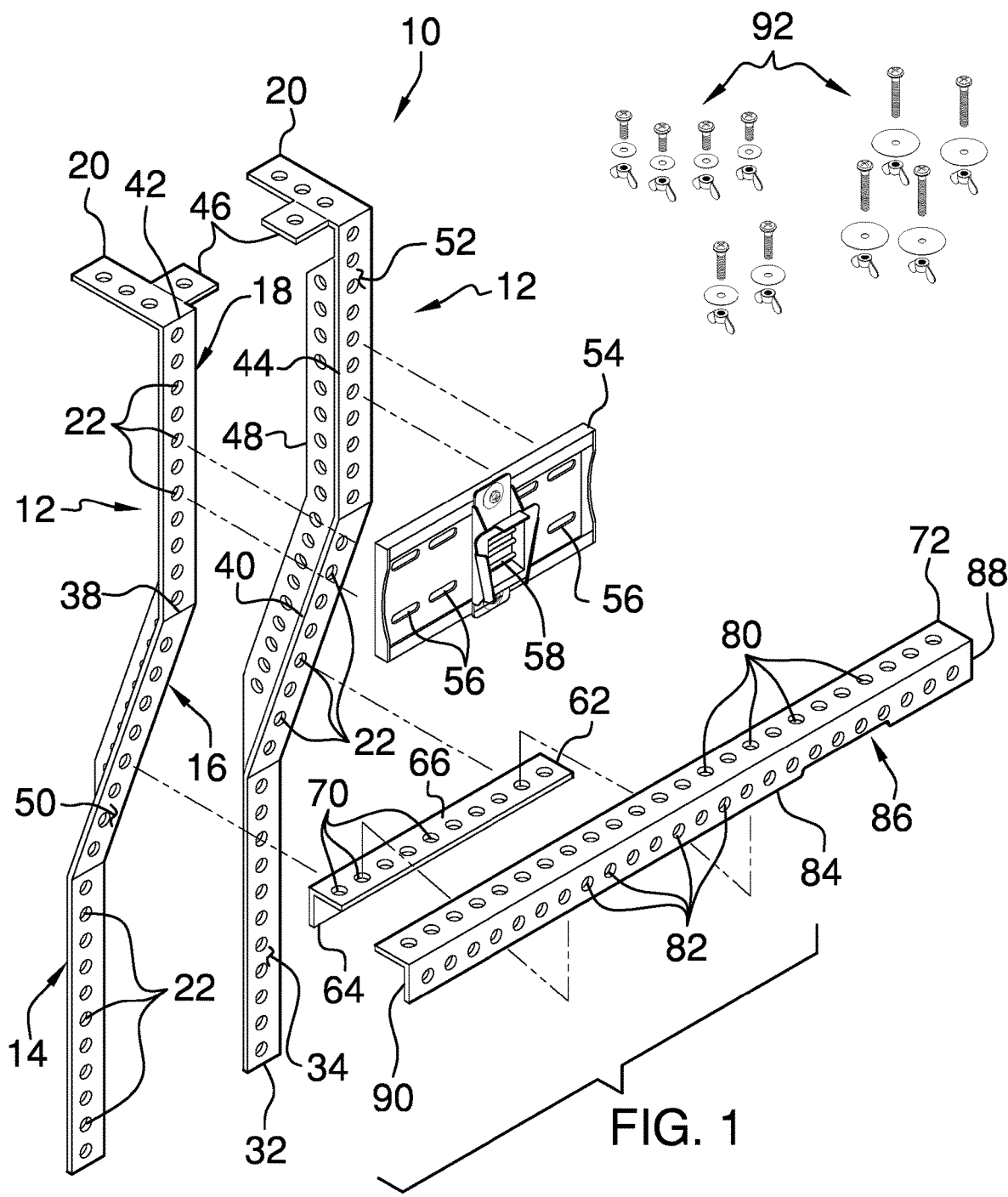
FIG. 1 is an exploded perspective view of a television mounting assembly according to an embodiment of the disclosure.
Figure 2:
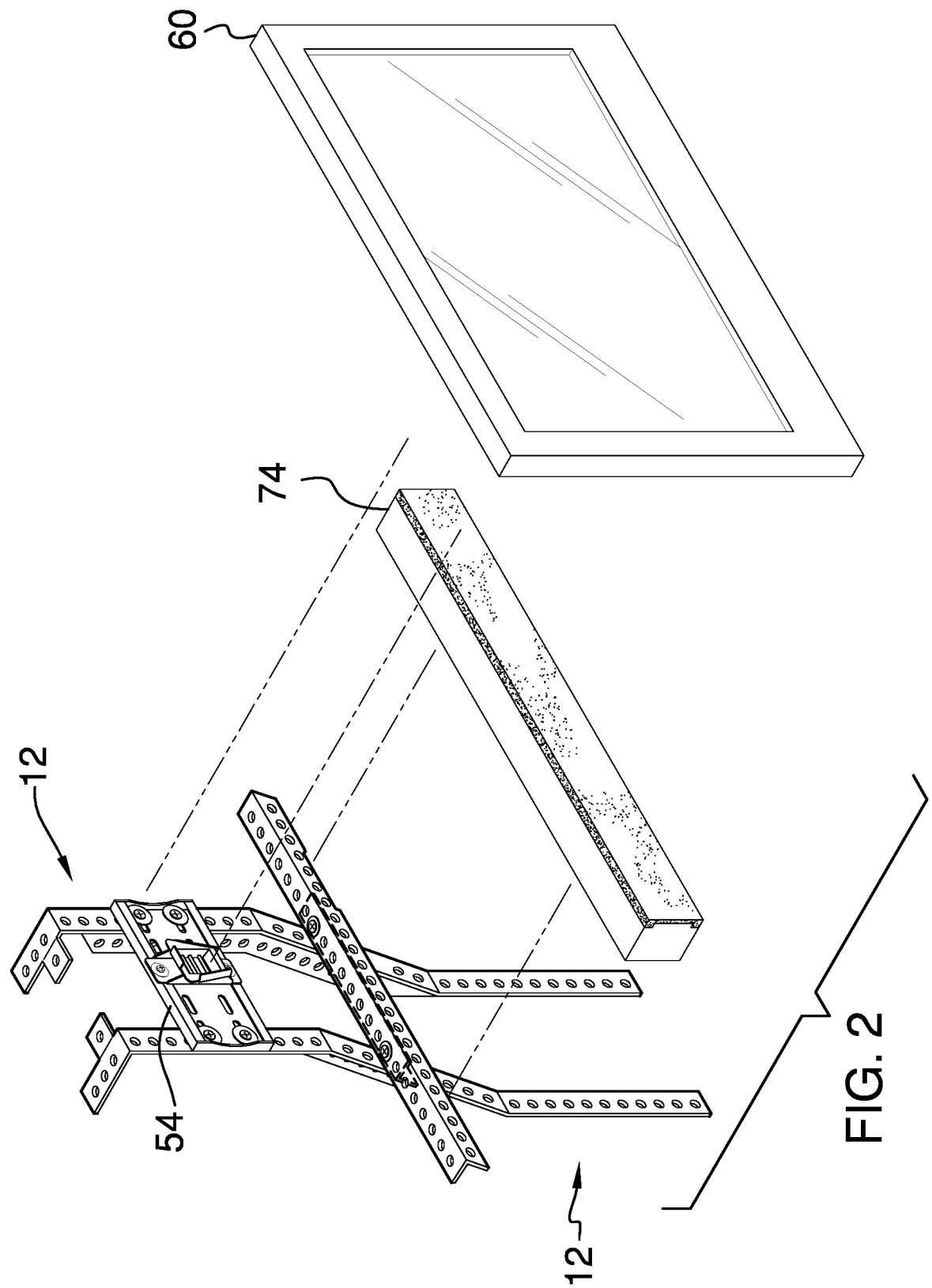
FIG. 2 is a front perspective view of an embodiment of the disclosure.
Figure 3:
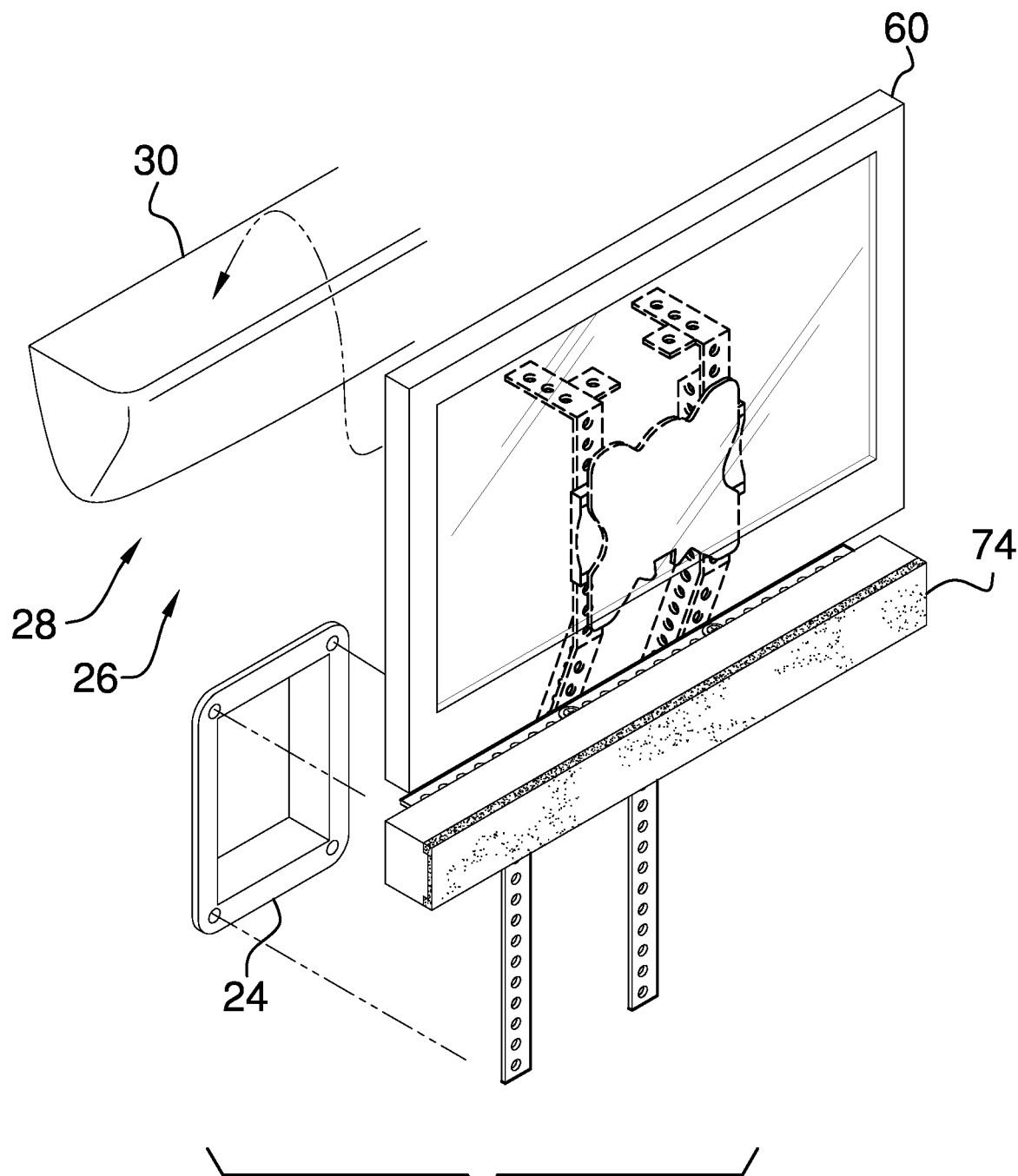
FIG. 3 is a perspective in-use view of an embodiment of the disclosure.
Figure 4:
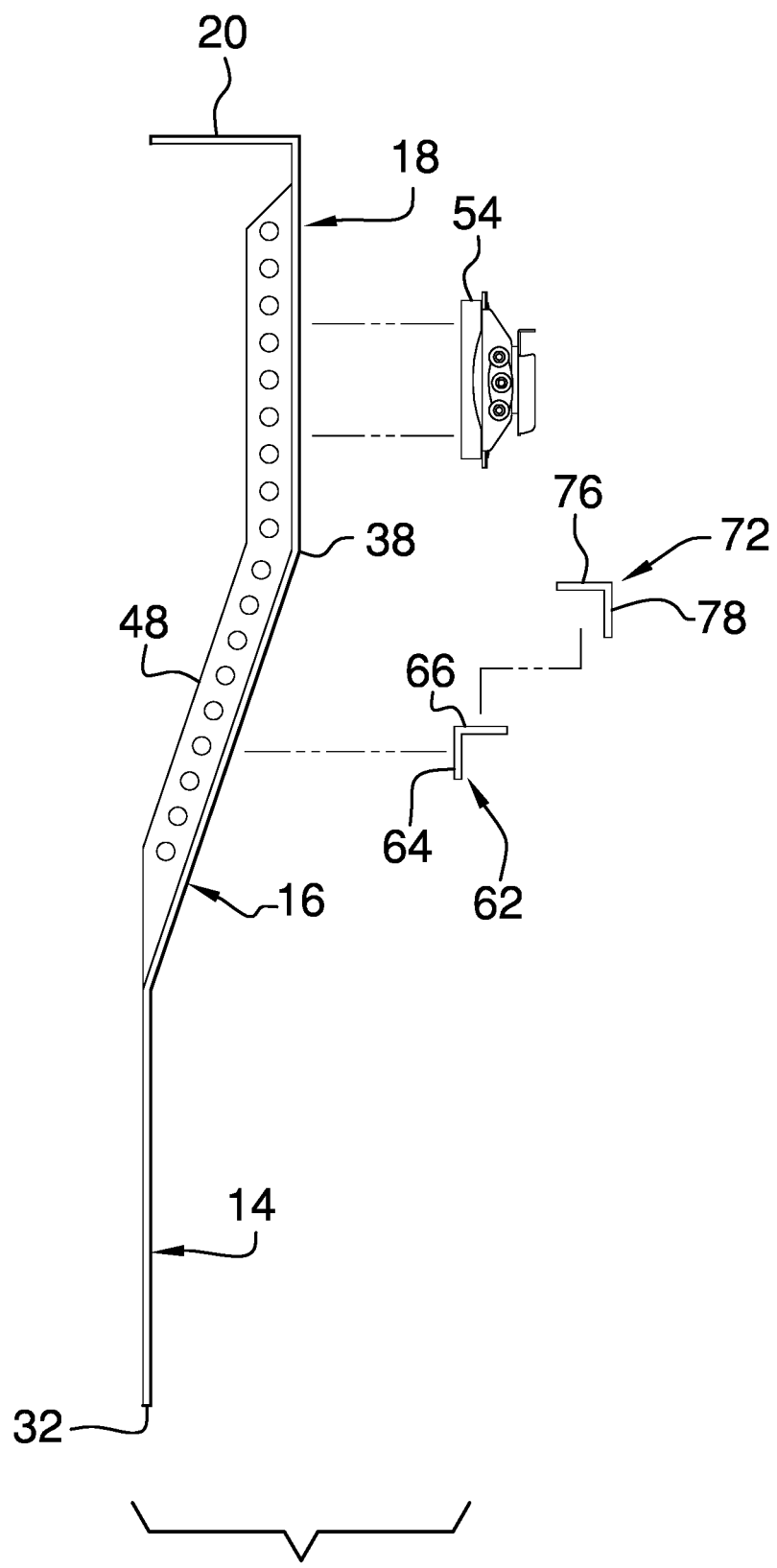
FIG. 4 is a right side exploded view of an embodiment of the disclosure.
Figure 5:
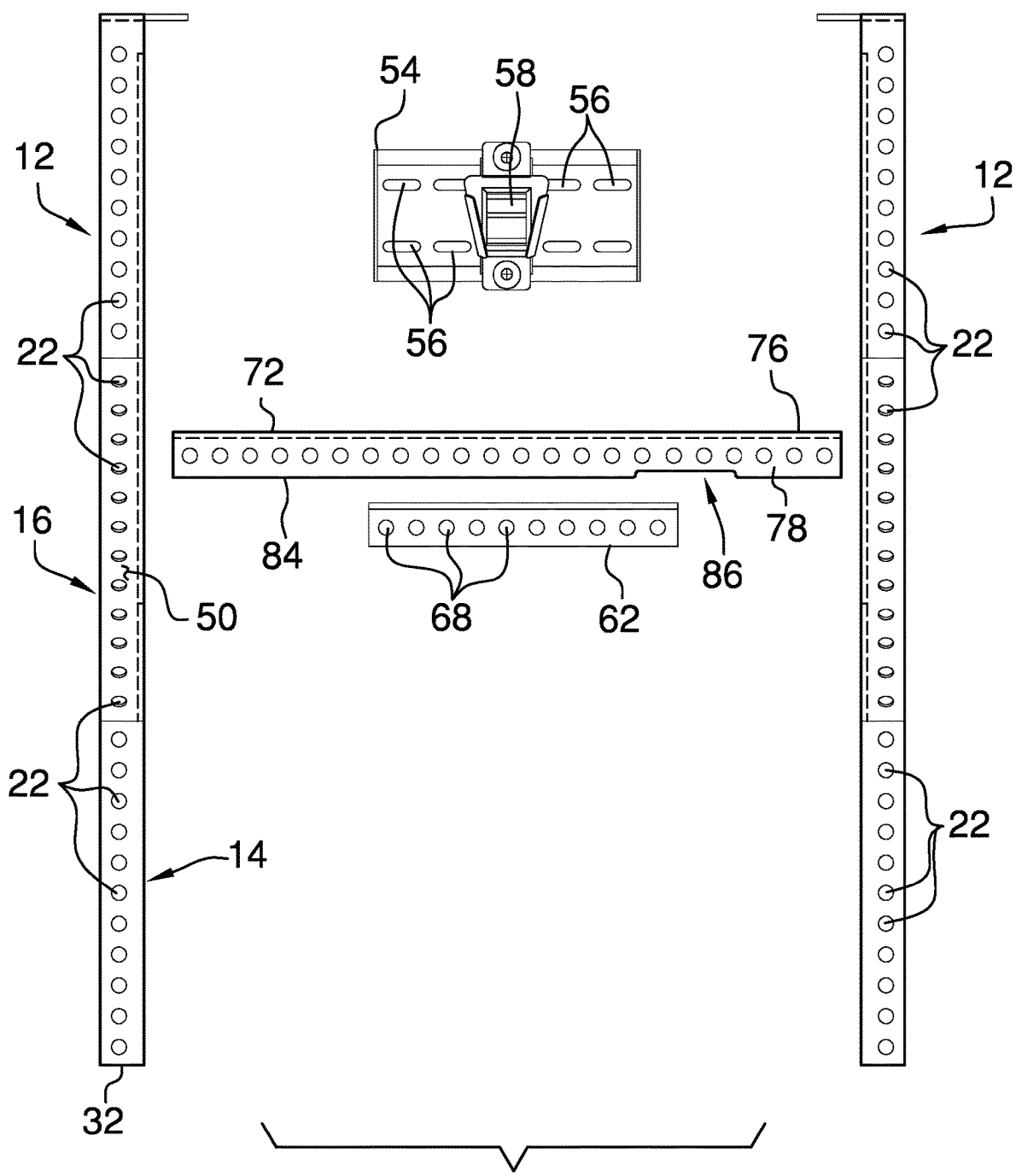
FIG. 5 is a front view of an embodiment of the disclosure.
Figure 6:
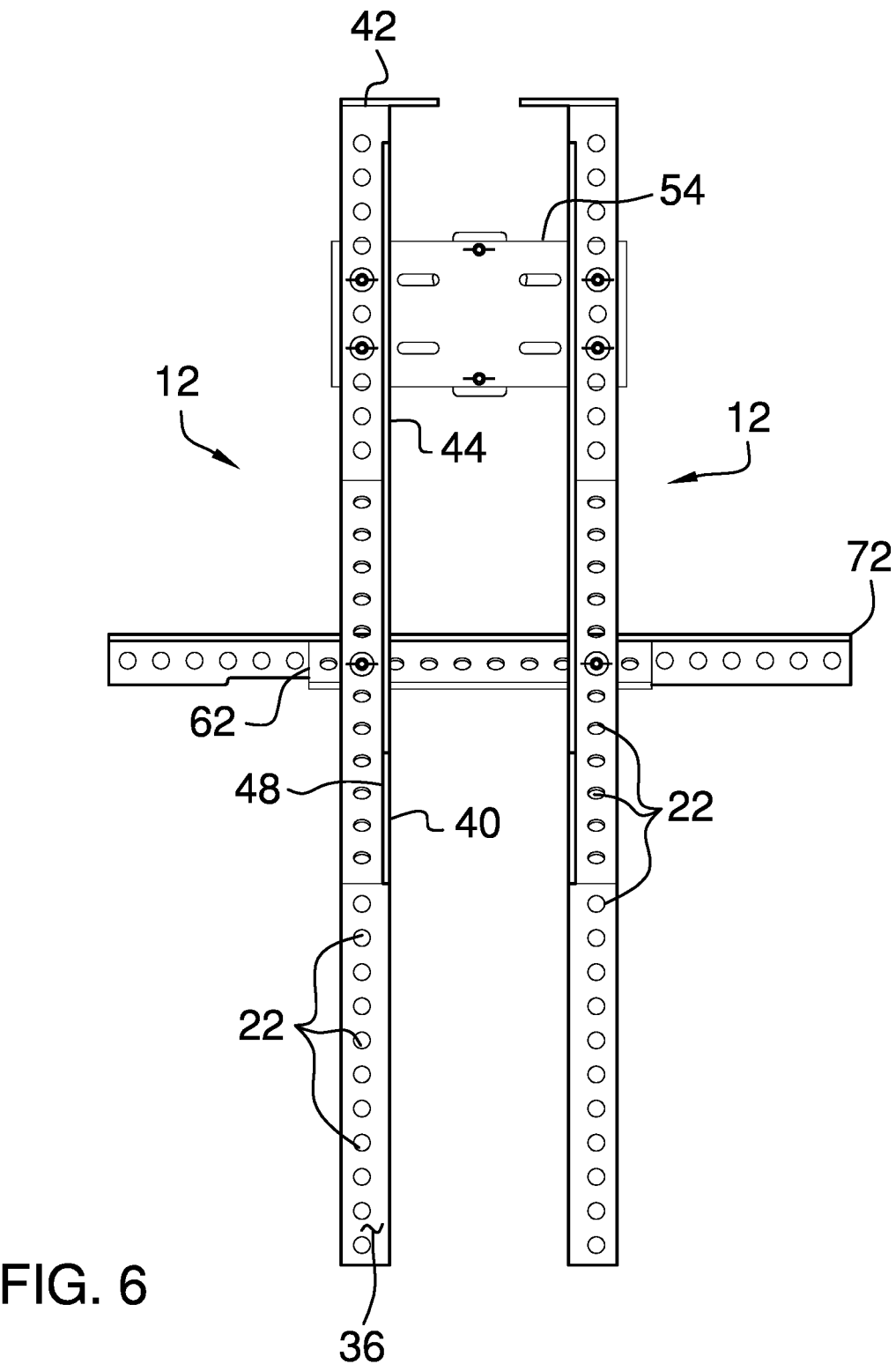
FIG. 6 is a back view of an embodiment of the disclosure.

With reference now to the drawings, and in particular to FIGS. 1 through 6 thereof, a new mounting device embodying the principles and concepts of an embodiment of the disclosure and generally designated by the reference numeral 10 will be described.

As best illustrated in FIGS. 1 through 6, the television mounting assembly 10 generally comprises a pair of first support brackets 12 that each has a lower portion 14, a central portion 16 angling outwardly from the lower portion 14, an upper portion 18 extending away from the central portion 16 and a foot 20 extending away from the upper portion 18. Each of the first support brackets 12 has a plurality of mounting holes 22 each being into the first support brackets 12. The mounting holes 22 in the lower portion 14 facilitate the lower portion 14 to be attached to a vent window frame 24 in a sleeper 26 of a semi truck 28. The semi truck 28 may be a Freightliner, a Peterbuilt, a Kenworth or any other manufacturer of over the road semi-trucks that have a sleeper 26. Each of the first support brackets 12 is comprised of a rigid material, such steel or other metallic alloy, such that the first support brackets 12 can resist the vibration and shaking commonly experienced in a semi-truck.

The foot 20 on the upper portion 18 of each of the first support brackets 12 engages a bed support 30 in the sleeper 26 of the semi-truck for suspending the first support brackets 12 from the bed support 30. The lower portion 14 of each of the first support brackets 12 has a distal end 32 with respect to the central portion 16 and a front surface 34 and a back surface 36, and the back surface 36 of the lower portion 14 abuts the vent window frame 24. The central portion 16 of each of the first support brackets 12 angles forwardly from the front surface 34 of the lower portion 14 such that the central portion 16 extends away from a wall of the sleeper 26 in which the vent window frame 24 is positioned. Moreover, the central portion 16 of each of the first support brackets 12 has a distal end 38 with respect to the lower portion 14 and a lateral edge 40.

The upper portion 18 of each of the first support brackets 12 extends upwardly from the distal end 38 of the central portion 16, and the upper portion 18 has a distal end 42 with respect to the central portion 16 and a lateral edge 44. The foot 20 of each of the first support brackets 12 extends away from the distal end 42 of the upper portion 18, and the foot 20 is perpendicularly oriented with the upper portion 18. The foot 20 of each of the first support brackets 12 has a tab 46 extending laterally away from the foot 20, and the tab 46 on each foot 20 is directed toward each other. Each of the first support brackets 12 has a rib 48 extending along the lateral edge 40 of the central portion 16 and the lateral edge 44 of the upper portion 18. Furthermore, the rib 48 lies on a plane that is perpendicularly oriented with a front surface 50 of the central portion 16 and a front surface 52 of the upper portion 18. In this way the rib 48 on each of the first support brackets 12 enhances structural rigidity of the first support brackets 12.

A television mounting bracket 54 is attachable to the upper portion 18 of each of the first support brackets 12. The television mounting bracket 54 is aligned with respective ones of the mounting holes 22 associated with the upper portion 18 thereby facilitating the television mounting bracket 54 to be positioned at a variety of locations along the upper portion 18. The television mounting bracket 54 has a plurality of mounting holes 56 extending through the television mounting bracket 54. Additionally, each of the mounting holes in the television mounting bracket 54 is aligned with respective ones of the mounting holes 22 in the upper portion 18 of a respective one of the first support brackets 12. The television mounting bracket 54 has an engagement mechanism 58 which is integrated into the television mounting bracket 54 for releasably engaging a television 60 for mounting the television 60 to the first support brackets 12.

A second support bracket 62 is attachable to the central portion 16 of each of the first support brackets 12 such that the second support bracket 62 extends between the first support brackets 12. The second support bracket 62 has a first portion 64 forming an angle with a second portion 66. The second support bracket 62 has a plurality of first apertures 68 extending through the first portion 64 and that are distributed along a full length of the first portion 64. The second support bracket 62 has a plurality of second apertures 70 extending through the second portion 66 and that are distributed along the second portion 66. The first portion 64 rests against the front surface 50 of the central portion 16 of each of the first support brackets 12 having the second portion 66 extending forwardly away from the front surface 50 of the central portion 16. Additionally, respective ones of the first apertures 68 are aligned with respective ones of the mounting holes 22 in the central portion 16 of each of the first support brackets 12.

A sound bar bracket 72 is mountable to the second support bracket 62 thereby facilitating a sound bar 74 to be mounted to the sound bar bracket 72. The sound bar bracket 72 has a primary portion 76 forming an angle with a secondary portion 78. The sound bar bracket 72 has a plurality of primary holes 80 each extending through the primary portion 76 and that are distributed along a full length of the primary portion 76. Additionally, the sound bar bracket 72 has a plurality of secondary holes 82 each extending through the secondary portion 78 and that are distributed along a full length of the secondary portion 78.

The secondary portion 78 has a bottom edge 84 and the bottom edge 84 has a recess 86 extending toward an intersection between the primary portion 76 and the secondary portion 78 for accommodating wires of the sound bar 74. Furthermore, the recess 86 is positioned closer to a first end 88 of the primary portion 76 than a second end 90 of the primary portion 76. The primary portion 76 rests on the second portion 66 of the second support bracket 62 when the sound bar bracket 72 is positioned on the second support bracket 62. Each of the second support bracket 62 and the sound bar bracket 72 are comprised of a rigid material, such as steel or other metallic alloy, for resisting the vibration and shaking commonly experienced in semi-trucks.

A plurality of fasteners 92 is provided and respective fasteners 92 are extendable through respective mounting holes 56 in the television mounting bracket 54 and engage respective mounting holes 22 in the upper portion 18 of each of the first support brackets 12 for attaching the television mounting bracket 54 to the pair of first support brackets 12. Additionally, respective fasteners 92 are extendable through respective first apertures 68 in the first portion 64 of the second support bracket 62 and engage respective mounting holes 22 in the central portion 16 of the first support brackets 12 for attaching the second support bracket 62 to the pair of first support brackets 12. Respective fasteners 92 are extendable through respective primary holes 80 in the primary portion 76 of the sound bar bracket 72 and engage respective second apertures 70 in the second portion 66 of the second support bracket 62 for attaching the sound bar bracket 72 to the second support bracket 62. Continuing, respective fasteners 92 are extendable through respective mounting holes 22 in the lower portion 14 of the first support brackets 12 and engage screw holes 94 in the vent window frame 24 in the sleeper 26. Each of the fasteners 92 may comprise a bolt, a washer and a wing nut or other type of releasable fastener.

In use, the foot 20 on each of the first support brackets 12 is positioned on top of the bed support 30 in the sleeper 26 of the semi truck 28 such that the lower portion 14 of each of the first support brackets 12 is aligned with the vent window frame 24. Each foot 20 is fastened to the bed support 30 and the lower portion 14 of each of the first support brackets 12 is attached to the vent window frame 24. The television mounting bracket 54 is attached to the upper portion 18 of each of the first support brackets 12 thereby facilitating the television 60 to be mounted to the television mounting bracket 54. The second support bracket 62 is fastened at a selected location along the central portion 16 of the pair of first support brackets 12 and the sound bar bracket 72 is attached to the second support bracket 62. In this way a sound bar 74 can be mounted below the television 60 for enhancing the audio quality of the television 60. Furthermore, the rigid construction of the first support brackets 12, the second support bracket 62 and the sound bar bracket 72 facilitate an extended service life that can resist the vibration and shaking common to semi-trucks.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A television mounting assembly for mounting a television and a sound bar in a sleeper of a semi truck, said assembly comprising:
   a pair of first support brackets, each of said first support brackets having a lower portion, a central portion angling outwardly from said lower portion, an upper portion extending away from said central portion and a foot extending away from said upper portion, each of said first support brackets having a plurality of mounting holes each being into said first support brackets, said mounting holes in said lower portion facilitating said lower portion to be attached to a vent window frame in the sleeper of a semi-truck, said foot on said upper portion of each of said first support brackets engaging a bed support in the sleeper of the semi-truck for suspending said first support brackets from the bed support;
   a television mounting bracket being attachable to said upper portion of each of said first support brackets, said television mounting bracket being aligned with respective ones of said mounting holes associated with said upper portion thereby facilitating said television mounting bracket to be positioned at a variety of locations along said upper portion;
   a second support bracket being attachable to said central portion of each of said first support brackets such that said second support bracket extends between said first support brackets; and
   a sound bar bracket being mountable to said second support bracket thereby facilitating the sound bar to be mounted to said sound bar bracket.

2. The assembly according to claim 1, wherein:
   said lower portion of each of said first support brackets has a distal end with respect to said central portion, a front surface and a back surface, said back surface of said lower portion abutting the vent window frame;
   said central portion of each of said first support brackets angles forwardly from said front surface of said lower portion such that said central portion extends away from a wall of the sleeper in which the vent window frame is positioned, said central portion of each of said first support brackets having a distal end with respect to said lower portion and a lateral edge;
   said upper portion of each of said first support brackets extends upwardly from said distal end of said central portion, said upper portion having a distal end with respect to said central portion and a lateral edge;
   said foot of each of said first support brackets extends away from said distal end of said upper portion, said foot being perpendicularly oriented with said upper portion;
   said foot of each of said first support brackets has a tab extending laterally away from said foot;
   each of said first support brackets has a rib extending along said lateral edge of said central portion and said lateral edge of said upper portion, said rib lying on a plane being perpendicularly oriented with a front surface of said central portion and a front surface of said upper portion.

3. The assembly according to claim 2, wherein said television mounting bracket has a plurality of mounting holes extending through said television mounting bracket, each of said mounting holes being aligned with respective ones of said holes in said upper portion of a respective one of said first support brackets, said television mounting bracket having an engagement mechanism being integrated into said television mounting bracket for releasably engaging the television for mounting the television to said first support brackets.

4. The assembly according to claim 2, wherein said second support bracket has a first portion forming an angle with a second portion, said second support bracket having a plurality of first apertures extending through said first portion and being distributed along a full length of said first portion, said second support bracket having a plurality of second apertures extending through said second portion and being distributed along said second portion.

5. The assembly according to claim 4, wherein said first portion rests against said front surface said central portion of each of said first support brackets having said second portion extending forwardly away from said front surface of said central portion, respective ones of said first apertures being aligned with respective ones of said mounting holes in said central portion of each of said first support brackets.

6. The assembly according to claim 1, wherein:
   said sound bar bracket has a primary portion forming an angle with a secondary portion, said sound bar bracket having a plurality of primary holes each extending through said primary portion and being distributed along a full length of said primary portion, said sound bar bracket having a plurality of secondary holes each extending through said secondary portion and being distributed along a full length of said secondary portion; and
   said secondary portion has a bottom edge, said bottom edge having a recess extending toward an intersection between said primary portion and said secondary portion for accommodating wires of the sound bar, said recess being positioned closer to a first end of said primary portion than a second end of said primary portion.

7. The assembly according to claim 6, wherein:
said second support bracket has a first portion forming an angle with a second portion; and
said primary portion of said sound bar bracket rests on said second portion of said second support bracket.

8. The assembly according to claim 3, further comprising a plurality of fasteners, respective ones of said fasteners being extendable through respective mounting holes in said television mounting bracket and engaging respective mounting holes in said upper portion of each of said first support brackets for attaching said television mounting bracket to said pair of first support brackets.

9. The assembly according to claim 4, further comprising a plurality of fasteners, respective ones of said fasteners being extendable through respective first apertures in said first portion of said second support bracket and engaging respective mounting holes in said central portion of said first support brackets for attaching said second support bracket to said pair of first support brackets.

10. The assembly according to claim 7, further comprising a plurality of fasteners, respective ones of said fasteners being extendable through respective primary holes in said primary portion of said sound bar bracket and engaging respective second apertures in said second portion of said second support bracket for attaching said sound bar bracket to said second support bracket.

11. The assembly according to claim 1, further comprising a plurality of fasteners, respective ones of said fasteners being extendable through respective mounting holes in said lower portion of said first support brackets and engaging screw holes in the vent window frame in the sleeper.

12. A television mounting assembly for mounting a television and a sound bar in a sleeper of a semi truck, said assembly comprising:
a pair of first support brackets, each of said first support brackets having a lower portion, a central portion angling outwardly from said lower portion, an upper portion extending away from said central portion and a foot extending away from said upper portion, each of said first support brackets having a plurality of mounting holes each being into said first support brackets, said mounting holes in said lower portion facilitating said lower portion to be attached to a vent window frame in the sleeper of a semi-truck, said foot on said upper portion of each of said first support brackets engaging a bed support in the sleeper of the semi-truck for suspending said first support brackets from the bed support, said lower portion of each of said first support brackets having a distal end with respect to said central portion, a front surface and a back surface, said back surface of said lower portion abutting the vent window frame, said central portion of each of said first support brackets angling forwardly from said front surface of said lower portion such that said central portion extends away from a wall of the sleeper in which the vent window frame is positioned, said central portion of each of said first support brackets having a distal end with respect to said lower portion and a lateral edge, said upper portion of each of said first support brackets extending upwardly from said distal end of said central portion, said upper portion having a distal end with respect to said central portion and a lateral edge, said foot of each of said first support brackets extending away from said distal end of said upper portion, said foot being perpendicularly oriented with said upper portion, said foot of each of said first support brackets having a tab extending laterally away from said foot, each of said first support brackets having a rib extending along said lateral edge of said central portion and said lateral edge of said upper portion, said rib lying on a plane being perpendicularly oriented with a front surface of said central portion and a front surface of said upper portion;
a television mounting bracket being attachable to said upper portion of each of said first support brackets, said television mounting bracket being aligned with respective ones of said mounting holes associated with said upper portion thereby facilitating said television mounting bracket to be positioned at a variety of locations along said upper portion, said television mounting bracket having a plurality of mounting holes extending through said television mounting bracket, each of said mounting holes being aligned with respective ones of said holes in said upper portion of a respective one of said first support brackets, said television mounting bracket having an engagement mechanism being integrated into said television mounting bracket for releasably engaging the television for mounting the television to said first support brackets;
a second support bracket being attachable to said central portion of each of said first support brackets such that said second support bracket extends between said first support brackets, said second support bracket having a first portion forming an angle with a second portion, said second support bracket having a plurality of first apertures extending through said first portion and being distributed along a full length of said first portion, said second support bracket having a plurality of second apertures extending through said second portion and being distributed along said second portion, said first portion resting against said front surface said central portion of each of said first support brackets having said second portion extending forwardly away from said front surface of said central portion, respective ones of said first apertures being aligned with respective ones of said mounting holes in said central portion of each of said first support brackets;
a sound bar bracket being mountable to said second support bracket thereby facilitating the sound bar to be mounted to said sound bar bracket, said sound bar bracket having a primary portion forming an angle with a secondary portion, said sound bar bracket having a plurality of primary holes each extending through said primary portion and being distributed along a full length of said primary portion, said sound bar bracket having a plurality of secondary holes each extending through said secondary portion and being distributed along a full length of said secondary portion, said secondary portion having a bottom edge, said bottom edge having a recess extending toward an intersection between said primary portion and said secondary portion for accommodating wires of the sound bar, said recess being positioned closer to a first end of said primary portion than a second end of said primary portion, said primary portion resting on said second portion of said second support bracket; and
a plurality of fasteners, respective ones of said fasteners being extendable through respective mounting holes in said television mounting bracket and engaging respective mounting holes in said upper portion of each of said first support brackets for attaching said television mounting bracket to said pair of first support brackets, respective ones of said fasteners being extendable through respective first apertures in said first portion of said second support bracket and engaging respective mounting holes in said, central portion of said first support brackets for attaching said second support bracket to said pair of first support brackets, respective ones of said fasteners being extendable through respective primary holes in said primary portion of said sound bar bracket and engaging respective second apertures in said second portion of said second support bracket for attaching said sound bar bracket to said second support bracket, respective ones of said fasteners being extendable through respective mounting holes in said lower portion of said first support brackets and engaging screw holes in the vent window frame in the sleeper.

\* \* \* \* \*